(12) United States Patent
Xu et al.

(10) Patent No.: US 10,908,833 B2
(45) Date of Patent: Feb. 2, 2021

(54) DATA MIGRATION METHOD FOR A STORAGE SYSTEM AFTER EXPANSION AND STORAGE SYSTEM

(71) Applicants: Huawei Technologies Co., Ltd., Shenzhen (CN); UNIVERSITY OF SCIENCE AND TECHNOLOGY OF CHINA, Hefei (CN)

(72) Inventors: Yinlong Xu, Hefei (CN); Zhipeng Li, Hefei (CN); Yuangang Wang, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 42 days.

(21) Appl. No.: 16/291,852

(22) Filed: Mar. 4, 2019

(65) Prior Publication Data
US 2019/0196738 A1 Jun. 27, 2019

Related U.S. Application Data

(63) Continuation of application No. PCT/CN2017/103053, filed on Sep. 23, 2017.

(30) Foreign Application Priority Data

Dec. 29, 2016 (CN) .......................... 2016 1 1251370
Feb. 23, 2017 (CN) .......................... 2017 1 0100458

(51) Int. Cl.
*G06F 3/06* (2006.01)
*G06F 11/10* (2006.01)
(Continued)

(52) U.S. Cl.
CPC ............ *G06F 3/0647* (2013.01); *G06F 3/064* (2013.01); *G06F 3/0607* (2013.01);
(Continued)

(58) Field of Classification Search
None
See application file for complete search history.

(56) References Cited

U.S. PATENT DOCUMENTS

| 6,079,028 A | 6/2000 | Ozden et al. |
| 2012/0030425 A1 | 2/2012 | Becker-Szendy et al. |

(Continued)

FOREIGN PATENT DOCUMENTS

| CN | 103513938 A | 1/2014 |
| CN | 104091139 A | 10/2014 |

(Continued)

OTHER PUBLICATIONS

Holland et al., "Parity Declustering for Continuous Operation in Redundant Disk Arrays," Architectural Support for Programming Languages and Operating Systems, ACM, XP058269840 pp. 23-35, (1992).

(Continued)

*Primary Examiner* — Charles J Choi
(74) *Attorney, Agent, or Firm* — Leydig, Voit & Mayer, Ltd.

(57) ABSTRACT

A data migration method for a storage system after expansion and a storage system are provided. After an $i^{th}$ expansion is performed on the storage system, data migration is performed by using an auxiliary balanced incomplete block design. Because a quantity of tuples including any element in the auxiliary balanced incomplete block design is identical, and each migration unit includes an identical quantity of parity chunks, a data migration amount after the expansion is minimized. In this way, time required for data migration after the expansion is significantly reduced, and a delay in a response to a user request that is caused because a data migration operation needs to be performed after the expansion is also reduced.

15 Claims, 5 Drawing Sheets

Before expansion

Auxiliary BIBD

After expansion

(51) Int. Cl.
*G11B 20/18* (2006.01)
*G06F 16/13* (2019.01)
*G06F 17/11* (2006.01)

(52) U.S. Cl.
CPC .......... *G06F 3/0611* (2013.01); *G06F 3/0646* (2013.01); *G06F 3/0689* (2013.01); *G06F 11/1076* (2013.01); *G06F 16/13* (2019.01); *G06F 17/11* (2013.01); *G11B 20/18* (2013.01); *G06F 3/0619* (2013.01)

(56) References Cited

U.S. PATENT DOCUMENTS

| | | |
|---|---|---|
| 2013/0339601 A1 | 12/2013 | Goel et al. |
| 2014/0351512 A1 | 11/2014 | Xu et al. |
| 2018/0095676 A1* | 4/2018 | Zhao .................. G06F 11/1469 |

FOREIGN PATENT DOCUMENTS

| | | |
|---|---|---|
| CN | 104407807 A | 3/2015 |
| CN | 104583930 A | 4/2015 |
| CN | 104809035 A | 7/2015 |
| CN | 105373352 A | 3/2016 |
| EP | 0469924 A3 | 2/1992 |

OTHER PUBLICATIONS

Schwabe et al., "Efficient data mappings for parity-declustered data layouts," Theoretical Computer Science, vol. 325, Elsevier, XP027173633, pp. 391-407 (2004).
Gang et al., "Data Layout of Network Based RAID," Journal of Computer Science, vol. 29, No. 5, China Academic Journal Electronic Publishing House (2002).
"RAID 2.0+ Technical White Paper," Huawei OceanStor Enterprise Unified Storage System, Issue 01, pp. 1-31, Huawei Technologies Co., Ltd. (Jun. 4, 2014).

* cited by examiner

Tuple 0: 0, 1, 2

Tuple 1: 0, 1, 3

Tuple 2: 0, 2, 3

Tuple 3: 1, 2, 3

Full block design table

Stripe number | Location of a parity chunk

0: 0, 1, 2
1: 0, 1, 3
2: 0, 2, 3
3: 1, 2, 3

| Offset | D0 | D1 | D2 | D3 |
|---|---|---|---|---|
| 0 | $P_0$ | $D_{0,0}$ | $D_{0,1}$ | $D_{1,1}$ |
| 1 | $D_{1,0}$ | $P_1$ | $P_2$ | $D_{2,1}$ |
| 2 | $D_{2,0}$ | $D_{3,0}$ | $D_{3,1}$ | $P_3$ |

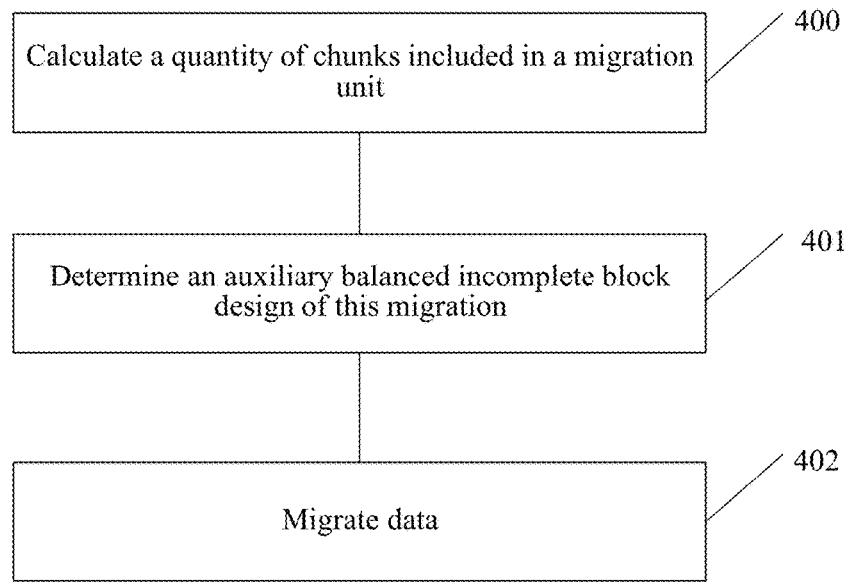
FIG. 4
Tuple 0: 0, 1, 2, 3
Tuple 1: 0, 1, 4, 5
Tuple 2: 0, 2, 4, 6
Tuple 3: 0, 3, 5, 6
Tuple 4: 1, 2, 5, 6
Tuple 5: 1, 3, 4, 6
Tuple 6: 2, 3, 4, 5
FIG. 5
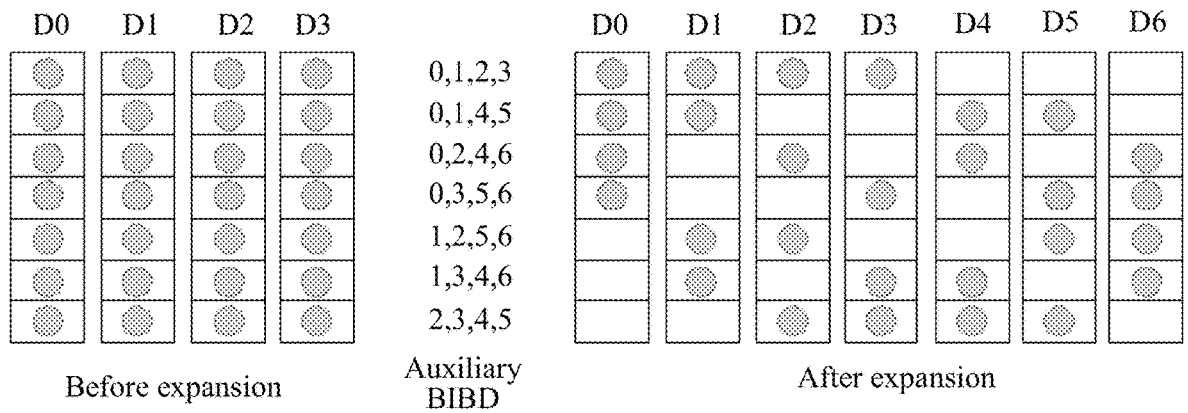
FIG. 6

| Offset | D0 | D1 | D2 | D3 | D4 | D5 | D6 |
|---|---|---|---|---|---|---|---|
| 0 | $P_0$ | $D_{0,0}$ | $D_{0,1}$ | $D_{1,1}$ | $D_{28,1}$ | | |
| 1 | $D_{1,0}$ | $P_1$ | $P_2$ | $D_{2,1}$ | | | |
| 2 | $D_{2,0}$ | $D_{3,0}$ | $D_{3,1}$ | $P_3$ | | | |
| 3 | $P_4$ | $D_{4,0}$ | $D_{28,0}$ | | $D_{4,1}$ | $D_{5,1}$ | |
| 4 | $D_{5,0}$ | $P_5$ | | | $P_6$ | $D_{6,1}$ | |
| 5 | $D_{6,0}$ | $D_{7,0}$ | | | $D_{7,1}$ | $P_7$ | |
| 6 | $P_8$ | $P_{28}$ | $D_{8,0}$ | | $D_{8,0}$ | | $D_{9,1}$ |
| 7 | $D_{9,0}$ | | $P_{10}$ | | $P_9$ | | $D_{10,1}$ |
| 8 | $D_{10,0}$ | | $D_{11,1}$ | | $D_{11,0}$ | | $P_{11}$ |
| 9 | $P_{12}$ | | | $D_{13,1}$ | | $D_{12,0}$ | $D_{12,1}$ |
| 10 | $D_{13,0}$ | | | $D_{14,1}$ | | $P_{13}$ | $P_{14}$ |
| 11 | $D_{14,0}$ | | | $P_{15}$ | | $D_{15,0}$ | $D_{15,1}$ |
| 12 | | $D_{16,0}$ | $D_{16,1}$ | | | $P_{16}$ | $D_{17,1}$ |
| 13 | | $P_{17}$ | $P_{18}$ | | | $D_{17,0}$ | $D_{18,1}$ |
| 14 | | $D_{19,0}$ | $D_{19,1}$ | | | $D_{18,0}$ | $P_{19}$ |
| 15 | | $D_{20,0}$ | | $D_{21,1}$ | $P_{20}$ | | $D_{20,1}$ |
| 16 | | $P_{21}$ | | $D_{22,1}$ | $D_{21,0}$ | | $P_{22}$ |
| 17 | | $D_{23,0}$ | | $P_{23}$ | $D_{22,0}$ | | $D_{23,1}$ |
| 18 | | | $D_{24,1}$ | $D_{25,1}$ | $P_{24}$ | $D_{24,0}$ | |
| 19 | | | $P_{26}$ | $D_{26,1}$ | $D_{25,0}$ | $P_{25}$ | |
| 20 | | | $D_{27,1}$ | $P_{27}$ | $D_{26,0}$ | $D_{27,0}$ | |

T[1]

| Stripe number | Number of a disk in which a parity chunk lies | | |
|---|---|---|---|
| 0 | 1, | 2, | 4 |
| 1 | 2, | 3, | 5 |
| 2 | 3, | 4, | 6 |
| 3 | 0, | 4, | 5 |
| 4 | 1, | 5, | 6 |
| 5 | 0, | 2, | 6 |
| 6 | 0, | 1, | 3 |

FIG. 9

DATA MIGRATION METHOD FOR A STORAGE SYSTEM AFTER EXPANSION AND STORAGE SYSTEM

CROSS-REFERENCE TO RELATED APPLICATIONS

This application is a continuation of International Application No. PCT/CN2017/103053, filed on Sep. 23, 2017, which claims priority to Chinese Patent Application No. 201611251370.8, filed on Dec. 29, 2016, and Chinese Patent Application No. 201710100458.8, filed on Feb. 23, 2017. All of the aforementioned patent applications are hereby incorporated by reference in their entireties.

STATEMENT OF JOINT RESEARCH AGREEMENT

The subject matter and the claimed invention were made by or on the behalf of University of Science and Technology of China, of Hefei, Anhui Province, P.R. China and Huawei Technologies Co., Ltd., of Shenzhen, Guangdong Province, P.R. China, under a joint research agreement titled "DATA MIGRATION METHOD FOR A STORAGE SYSTEM AFTER EXPANSION AND STORAGE SYSTEM". The joint research agreement was in effect on or before the claimed invention was made, and that the claimed invention was made as a result of activities undertaken within the scope of the joint research agreement.

TECHNICAL FIELD

Embodiments of this application relate to the field of storage technologies, and in particular, to a data migration method for a storage system after expansion and a storage system.

BACKGROUND

In the conventional art, a storage system is used to store massive data of enterprises and users. With explosive growth of information, increasing data needs to be stored in the storage system. Therefore, the existing storage system usually needs to be expanded. In the conventional art, after the storage system is expanded, a new data layout type needs to be designed for the expanded storage system, and all data stored in the storage system before the expansion is migrated to corresponding locations in the expanded storage system based on the new data layout type. In this method, all of the data stored in the storage system before the expansion is migrated. Consequently, a workload of data migration after the expansion is very heavy, and data migration needs much time.

SUMMARY

This application provides a data migration method for a storage system after expansion and a storage system. Therefore, after the storage system is expanded, only a part of data stored before the expansion needs to be migrated, thereby reducing a workload of data migration after the expansion.

According to a first aspect, an embodiment of this application provides a data migration method for a storage system after expansion, where the storage system includes a controller, the storage system includes $v_{i-1}$ disks before an $i^{th}$ expansion, the storage system includes $v_i$ disks after the $i^{th}$ expansion, i is greater than or equal to 1, the controller is capable of communicating with all disks, the data is distributed on the disks in the storage system based on a parity declustering technology, and the method includes:

determining, by the controller, a quantity of chunks included in a migration unit for the $i^{th}$ expansion;

dividing storage space of each of the $v_{i-1}$ disks included in the storage system before the $i^{th}$ expansion into a plurality of migration units, where each migration unit includes the foregoing quantity of chunks;

determining, based on a quantity $v_i$ of disks included in the storage system after the $i^{th}$ expansion and a quantity $v_{i-1}$ of disks included in the storage system before the $i^{th}$ expansion, an auxiliary balanced incomplete block design $\hat{B}[i]$ required for data migration after the $i^{th}$ expansion; and selecting, based on the auxiliary balanced incomplete block design $\hat{B}[i]$, at least one migration unit from the plurality of migration units of the $v_{i-1}$ disks before the $i^{th}$ expansion, and migrating chunks included in the selected at least one migration unit to one of the $v_i$ disks after the $i^{th}$ expansion.

With reference to the first aspect, in a first implementation of the first aspect, that the data is distributed on the disks in the storage system based on a parity declustering technology is specifically:

determining, by the controller based on a full block design table, a storage location of the data in the storage system, where the full block design table is generated based on the balanced incomplete block design, and parameters of the balanced incomplete block design are (b, v, k, r, λ), where v indicates that the storage system includes v disks;

b indicates that the storage system includes b stripes, respectively corresponding to b tuples of the balanced incomplete block design, where each element in each of the b tuples represents a disk number of a disk in which a chunk is stored in the storage system;

k indicates that each stripe includes k chunks;

r indicates that each disk includes r chunks;

any two of the v disks each include λ same stripes; and the chunk is a data chunk or a parity chunk.

With reference to the first implementation of the first aspect, in a second implementation of the first aspect, the method further includes: generating a full block design table T[i] for the storage system after each expansion, where T[i] is a full block design table used for storing new data after the $i^{th}$ expansion, and $b_i$, $v_i$, $k_i$, $r_i$, and $\lambda_i$ are BIBD parameters forming T[i].

With reference to the first aspect, in a third implementation of the first aspect, the determining, based on a quantity $v_i$ of disks included in the storage system after the $i^{th}$ expansion and a quantity $v_{i-1}$ of disks included in the storage system before the $i^{th}$ expansion, an auxiliary balanced incomplete block design $\hat{B}[i]$ required for data migration after the $i^{th}$ expansion is specifically:

determining that a value of a parameter $\hat{v}_i$ of $\hat{B}[i]$ is a value of $v_i$, and a value of $\hat{k}_i$ is a value of $v_{i-1}$;

querying a balanced incomplete block design database based on $\hat{v}_i$ and $\hat{k}_i$, to determine a value of $\hat{\lambda}_i$;

querying the balanced incomplete block design database based on the values of $\hat{v}_i$, $\hat{k}_i$, and $\hat{\lambda}_i$, to determine a tuple forming $\hat{B}[i]$; and determining values of parameters $\hat{b}_i$ and $\hat{r}_i$ of $\hat{B}[i]$.

With reference to any one of the first aspect and the foregoing implementations, in a fourth implementation of the first aspect, the determining, by the controller, a quantity of chunks included in a migration unit is specifically determining a quantity of chunks included in the migration unit by using the following formula:

$$len_i = \begin{cases} r_0, & i = 1 \\ len_{i-1} \times \hat{b}_{i-1} \times \dfrac{r_{i-1}}{gcd(len_{i-1}(\hat{b}_{i-1} - \hat{r}_{i-1}), r_{i-1})}, & i > 1 \end{cases},$$

where $r_{i-1}$ is a parameter of a balanced incomplete block design T[i−1]; and $\hat{b}_{i-1}$ and $\hat{r}_{i-1}$ are parameters of a balanced incomplete block design B[i−1], and gcd is an operation of taking a greatest common divisor.

With reference to any one of the first aspect and the foregoing implementations, in a fifth implementation of the first aspect, the selecting, based on the auxiliary balanced incomplete block design $\hat{B}[i]$, at least one migration unit from the plurality of migration units of the $v_{i-1}$ disks before the $i^{th}$ expansion, and migrating chunks included in the selected at least one migration unit to one of the $v_i$ disks after the $i^{th}$ expansion is specifically:

when the selected at least one migration unit is Rm,n, where m represents a migration unit number of the selected at least one migration unit, and n represents a number of a disk in which the selected at least one migration unit is located;

obtaining a set S0, where the set S0 is a difference set between a tuple m of $\hat{B}[i]$ and a set $\{0, 1, \ldots, v_{i-1}-1\}$;

obtaining a set S1, where the set S1 is a difference set between the set $\{0, 1, \ldots, v_{i-1}-1\}$ and the tuple m of $\hat{B}[i]$;

if a value of n is a $k^{th}$ smallest element in the set S1, determining that a target disk number to which the migration unit Rm,n is to be migrated is an element whose value is the $k^{th}$ smallest in the set S0; and migrating the migration unit Rm,n to a disk corresponding to the target disk number.

Optionally, an offset of the migration unit Rm,n during the migration is maintained unchanged.

A second aspect of embodiments of this application provides a storage system, where the storage system includes a controller, the storage system includes $v_{i-1}$ disks before an $i^{th}$ expansion, the storage system includes $v_i$ disks after the $i^{th}$ expansion, i is greater than or equal to 1, and the controller is capable of communicating with all disks;

the disks are configured to store data, and the data is distributed on the disks based on a parity declustering technology; and the controller is configured to: determine a quantity of chunks included in a migration unit for the $i^{th}$ expansion; divide storage space of each of the $v_{i-1}$ disks included in the storage system before the $i^{th}$ expansion into a plurality of migration units, where each migration unit includes the foregoing quantity of chunks; determine, based on a quantity $v_i$ of disks included in the storage system after the $i^{th}$ expansion and a quantity $v_{i-1}$ of disks included in the storage system before the expansion, an auxiliary balanced incomplete block design $\hat{B}[i]$ required for data migration after the $i^{th}$ expansion; and select, based on the auxiliary balanced incomplete block design $\hat{B}[i]$, at least one migration unit from the plurality of migration units of the $v_{i-1}$ disks before the $i^{th}$ expansion, and migrate chunks included in the selected at least one migration unit to one of the $v_i$ disks after the $i^{th}$ expansion.

The first to the fifth implementations of the second aspect are the same as the first to the fifth implementations of the first aspect. Details are not described herein again.

According to a third aspect, an embodiment of this application provides a controller. The controller is applied to a storage system. The storage system includes the controller. The storage system includes $v_{i-1}$ disks before an $i^{th}$ expansion, and the storage system includes $v_i$ disks after the $i^{th}$ expansion, where i is greater than or equal to 1; the controller is capable of communicating with all disks; the data is distributed on the disks in the storage system based on a parity declustering technology; the controller includes a processor and a memory, the memory stores a program instruction, and the processor is configured to execute the program instruction to complete the following actions:

determining, by the controller, a quantity of chunks included in a migration unit for the $i^{th}$ expansion;

dividing storage space of each of the $v_{i-1}$ disks included in the storage system before the expansion into a plurality of migration units, where each migration unit includes the foregoing quantity of chunks;

determining, based on a quantity $v_i$ of disks included in the storage system after the $i^{th}$ expansion and a quantity $v_{i-1}$ of disks included in the storage system before the $i^{th}$ expansion, an auxiliary balanced incomplete block design $\hat{B}[i]$ required for data migration after the $i^{th}$ expansion; and selecting, based on the auxiliary balanced incomplete block design $\hat{B}[i]$, at least one migration unit from the plurality of migration units of the $v_{i-1}$ disks before the $i^{th}$ expansion, and migrating chunks included in the selected at least one migration unit to one of the $v_i$ disks after the $i^{th}$ expansion.

The first to the fifth implementations of the third aspect are the same as the first to the fifth implementations of the first aspect. Details are not described herein again.

With reference to the third aspect or the second implementation of the third aspect, in a sixth implementation of the third aspect, the controller further includes a first communications interface, the first communications interface is further configured to receive a write request from a host, where the write request carries new to-be-written data; the memory is further configured to buffer the new to-be-written data; the processor is configured to determine a parity chunk of the new to-be-written data; and the processor is further configured to respectively write, based on T[i], the new to-be-written data and the parity chunk of the new to-be-written data to disks by using the second communications interface.

According to a fourth aspect, an embodiment of this application provides a storage medium. The storage medium stores a program. When the program is run by a computing device, the computing device performs the method according to the first aspect or any implementation of the first aspect. The storage medium includes, but is not limited to, a flash memory, an HDD, or an SSD.

A fifth aspect of this application provides a computer program product. The computer program product includes a program instruction. When the computer program product is executed by a computer, the computer performs the method according to the first aspect or any implementation of the first aspect. The computer program product may be a software installation package.

In the embodiments of the present invention, after the $i^{th}$ expansion is performed on the storage system, data migration is guided by using the auxiliary balanced incomplete block design $\hat{B}[i]$. Because a quantity of tuples including any element in the auxiliary balanced incomplete block design B̂[i] is identical, and each migration unit includes an identical quantity of parity chunks, a data migration amount after the expansion is minimized. In this way, time required for data migration after the expansion is significantly reduced, and a delay in a response to a user request that is caused because a data migration operation needs to be performed after the expansion is also reduced.

BRIEF DESCRIPTION OF DRAWINGS

FIG. 4 is a schematic flowchart of a data migration method for a storage system after expansion according to an embodiment of the present invention;

FIG. 5 is a diagram of tuples of an auxiliary BIBD according to an embodiment of the present invention;

FIG. 6 is a schematic logic diagram of data migration according to an embodiment of the present invention;

FIG. 9 is a schematic diagram of writing new data to a storage system after expansion according to an embodiment of the present invention.

DESCRIPTION OF EMBODIMENTS

Figures 1, 2, 3:
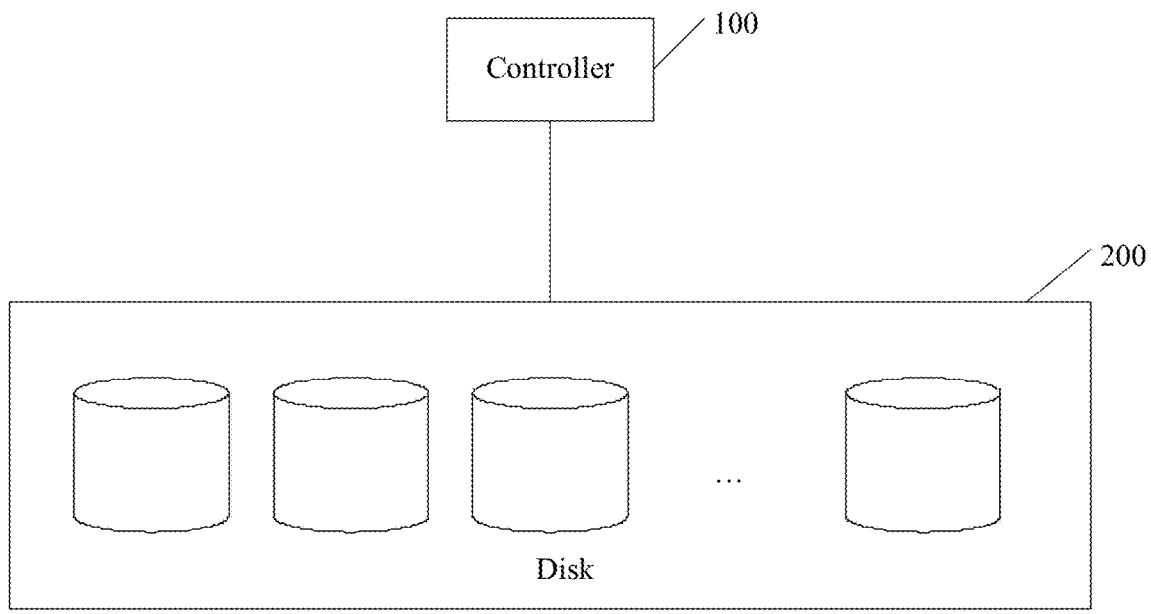
FIG. 1 is a schematic composition diagram of a storage system according to an embodiment of the present invention.
FIG. 2 is a diagram of tuples of a (4, 4, 3, 3, 2)-BIBD according to an embodiment of the present invention.
FIG. 3 is a diagram of an example of a full block design table constructed based on the BIBD shown in FIG. 2 according to an embodiment of the present invention.

FIG. 1 is a composition diagram of a storage system according to an embodiment of the present invention. The storage system includes a controller and a disk. In actual networking, there may be a plurality of disks.

The controller may communicate with a host (not shown), for example, may communicate with the host by using a storage area network (SAN) or by using another network such as an Ethernet, a local area network, or a wide area network. The controller may be a computing device such as a server or a desktop computer. An operating system and an application program may be installed on the controller. The controller may receive an input/output (I/O) request from the host. The controller may further store data (if any) carried in the I/O request, and write the data to the disk.

FIG. 1 is merely a description example. During actual application, the storage system may include a plurality of controllers. Physical structures and functions of the controllers are similar. The controllers can communicate with each other, and each controller can communicate with the disks. A quantity of controllers, a connection manner between the controllers, and a connection manner between any controller and the disks are not limited in this embodiment.

The controller is a system controller of the storage system. The system controller is usually an independent device. Unless otherwise specified, each controller in this embodiment is a system controller.

For each chunk to be stored in the storage system, a location of the chunk in the storage system is determined in a manner in which a balanced incomplete block design (BIBD) is satisfied. The chunk may be a data chunk or may be a parity chunk. Such data distribution manner is usually also referred to as a parity declustering technology. The BIBD is a "balanced incomplete block design" in combinatorial mathematics, and is defined as follows:

Assuming that a set X={0, 1, ..., v–1}, and B={T0, T1, Tb–1} is a block design of the set X, if the following conditions are satisfied, B is referred to as a (b, v, k, r, λ)-BIBD:

$|T0|=|T1|= \ldots =|Tb-1|=k;$ any element in X belongs to r tuples; and
any pair of elements in X is included in λ tuples.

FIG. 2 shows a (4, 4, 3, 3, 2)-BIBD, where b=4, v=4, k=3, r=3, and λ=2, λ={0, 1, 2, 3}, and B={T0, T1, T2, T3}. T0 is a tuple 0, T1 is a tuple 1, T2 is a tuple 2, T3 is a tuple 3, and |T0|=|T1|=|T2|=|T3|=k=3 is satisfied. Any element in X belongs to r=3 tuples. For example, an element 0 in X belongs to the tuples T0, T1, and T2. Any pair of elements in X is included in λ=2 tuples. For example, a pair of elements, namely, the element 0 and an element 1, is included in the tuples T0 and T1.

In this embodiment of the present invention, the controller generates a full block design table by using the (b, v, k, r, λ)-BIBD, and determines a storage location of each chunk on the disks of the storage system based on the full block design table. In the storage system corresponding to the full block design table, v disks form a disk array, there is a total of b stripes, each stripe includes k chunks, each disk includes r chunks, and any two disks each include λ same stripes. For example, stripes to which chunks stored in a disk 1 belong are consistent with λ stripes of stripes to which chunks stored in a disk 2 belong. b tuples of the BIBD respectively are corresponding to the b stripes. Each element in each tuple represents a disk number of a disk in which a chunk should be stored and that is in the storage system. Some elements in each tuple may be marked to represent parity chunks, and the parity chunks are evenly distributed due to such marking. In this embodiment of the present invention, the parity declustering technology is that the full block design table is used to guide a number of a disk into which each chunk (for example, a data chunk or a parity chunk) should be placed and the chunk is on a location on which an offset is minimized. In this embodiment, the offset means that: storage space of each disk is divided based on a length of the chunk, and storage space of the length of each chunk is corresponding to one offset. Offsets may be numbered from a start storage location of each disk, and are usually numbered from 0.

FIG. 3 is a diagram of an example of a full block design table constructed by using the (4, 4, 3, 3, 2)-BIBD shown in FIG. 2 according to an embodiment of the present invention, and shows location distribution of chunks that are completed based on the full block design table and that are in a corresponding storage system. In the full block design table on the left side of FIG. 3, stripe numbers 0 to 3 respectively are corresponding to the tuples 0 to 3 in FIG. 2. As described above, each element in a tuple corresponding to each stripe represents a disk number of a disk in which a corresponding chunk is stored in the storage system. A square box in the figure is used to mark a parity chunk in the stripe, and an element in each stripe represents a disk number of a disk in which the parity chunk in the stripe is stored and that is in the storage system. As shown in the figure, a value of a tuple T0 corresponding to a stripe 0 is {0, 1, 2}. That is, this indicates that three chunks included in the stripe 0 should be respectively stored in three disks whose disk numbers are D0, D1, and D2. A first element in the stripe 0 is a parity chunk, and the parity chunk should be on the disk D0. Therefore, in a disk array on the right side of FIG. 3, $P_0$, $D_{0,0}$, and $D_{0,1}$ are respectively on the disks D0, D1, and D2. Herein, Pi represents a parity chunk of an $i^{th}$ stripe, Di,j represents a data chunk of the $i^{th}$ stripe, and a value of j ranges from 0 to k-1, respectively representing k data chunks in the $i^{th}$ stripe.

In this embodiment of the present invention, it is assumed that T[0], T[1], . . . , and T[t] are full block design tables used in historical records of expansion, where T[i] is a full block design table used for filling new data after an $i^{th}$ expansion, T[0] is a full block design table used before the storage system is expanded, and $b_i$, $v_i$, $k_i$, $r_i$, and $\lambda_i$ are BIBD parameters forming T[i]. A quantity of disks added during the $i^{th}$ expansion is $v_i - v_{i-1}$. $\hat{B}[1]$, $\hat{B}[2]$, . . . , and $\hat{B}[t]$ are auxiliary balanced incomplete block designs used in the historical records of expansion, where $\hat{B}[i]$ is an auxiliary BIBD required for data migration after the $i^{th}$ expansion, $b\hat{b}_i$, $\hat{v}_i$, $\hat{k}_i$, $\hat{r}_i$, and $\hat{\lambda}_i$ are BIBD parameters of $\hat{B}[i]$, and $\hat{v}_i = v_i$ and $\hat{k}_i = v_{i-1}$ need to be satisfied. Based on the foregoing descriptions, a person skilled in the art may understand that if the storage system is not expanded, the controller determines a storage location of new written data on the disk based on T[0], that is, queries stored data based on T[0]. When the first expansion is performed, the controller generates $\hat{B}[1]$ and completes data migration based on $\hat{B}[1]$. Then, in the storage system after the first expansion, the controller queries, based on T[0] and $\hat{B}[1]$, data stored before the first expansion, and further generates T[1]; and is configured to determine, based on T[1], a storage location of data written to the storage system after the first expansion. Further, when the second expansion needs to be performed, the controller generates $\hat{B}[2]$ and completes data migration based on $\hat{B}[2]$. Then, in the storage system after the second expansion, the controller queries, based on T[0], $\hat{B}[1]$, T[1], and $\hat{B}[2]$, data stored before the second expansion, and further generates T[2]; and is configured to determine, based on T[2], a storage location of data written to the storage system after the second expansion, and so on. After the $i^{th}$ expansion, the controller queries, based on T[0], T[1], . . . , and T[i-1] and based on $\hat{B}[1]$, $\hat{B}[2]$, . . . , and $\hat{B}[i]$, data stored before the $i^{th}$ expansion, and further generates T[i]; and determines, based on T[i], a storage location of data written to the storage system after the $i^{th}$ expansion.

FIG. 4 is a schematic flowchart of a data migration method for an expanded storage system according to an embodiment of the present invention.

Step 400. A controller determines a quantity of chunks included in a migration unit.

Before expansion, storage space of each disk is divided into a plurality of areas, each area includes an identical quantity of chunks, and a data volume read in each area within a same offset range of each disk in the storage system is identical. Such area is used as the migration unit. It may be learned that each migration unit includes an identical quantity of parity chunks. During data migration, the migration unit is a minimum unit of data migration. If a migration unit needs to be migrated, all chunks in the migration unit are migrated. In this embodiment of the present invention, $len_i$ is defined by using the following formula, which is used to represent a quantity of chunks included in one migration unit during an $i^{th}$ expansion:

$$len_i = \begin{cases} r_0, & i = 1 \\ len_{i-1} \times \hat{b}_{i-1} \times \dfrac{r_{i-1}}{gcd(len_{i-1}(\hat{b}_{i-1} - \hat{r}_{i-1}), r_{i-1})}, & i > 1 \end{cases}.$$

A meaning of the foregoing formula is as follows:

when i=1, that is, when the first expansion is performed on the storage system, a quantity of chunks that should be included in the migration unit is $r_0$; and when $i > 1$, $$len_i = \left\{ len_{i-1} \times \hat{b}_{i-1} \times \dfrac{r_{i-1}}{gcd(len_{i-1}(\hat{b}_{i-1} - \hat{r}_{i-1}), r_{i-1})}, i > 1, \right.$$

where gcd is an operation of taking a greatest common divisor, $r_{i-1}$ is a parameter of a balanced incomplete block design forming T[i-1], and $\hat{b}_{i-1}$ and $\hat{r}_{i-1}$ are parameters of a balanced incomplete block design forming B[i-1].

Assuming that a storage system including four disks shown in FIG. 3 has not been expanded, BIBD parameters forming T[0] of the storage system are $(b_0, v_0, k_0, r_0, \lambda_0) = (4, 4, 3, 3, 2)$. Using the first expansion as an example, a quantity of chunks included in the migration unit is $len_1 = r_0 = 3$. That is, the quantity of chunks included in the migration unit for the first expansion is 3.

After determining, based on the foregoing method, a quantity $len_i$ of chunks included in a migration unit required for performing data migration after the $i^{th}$ expansion, the controller divides, based on $len_i$, storage space of each disk included in the storage system before the $i^{th}$ expansion, to obtain one or more areas. If an area includes a valid chunk, that is, the area stores valid data before the expansion, it indicates that the area is a migration unit. A person of ordinary skill in the art may understand that if an area does not include a valid chunk, it indicates that the area does not store data before the expansion or stored data is deleted. This indicates that data migration does not need to be performed in the area after the expansion. In this embodiment of the present invention, Rm,n may be used to represent a migration unit, where m represents a migration unit number of the migration unit, and n represents a number of a disk in which the migration unit is located before the $i^{th}$ expansion is performed on the storage system. In this embodiment of the present invention, m may be obtained by performing calculation by using the following formula:

$$m = \left\lfloor \dfrac{\text{Offset}}{len_i} \right\rfloor$$

That is, rounding-down is performed after an offset of each chunk on a disk n is divided by $len_i$, so that a migration unit number of a migration unit to which the chunk belongs may be learned. The foregoing example is used for description. Assuming that a quantity of chunks included in a migration unit during the first expansion of the storage system is 3, it may be learned, based on the foregoing formula, that on each disk, three chunks whose offsets are 0, 1, and 2 belong to a migration unit 0, three chunks whose offsets are 3, 4, and 5 belong to a migration unit 1, and so on.

Step 401. The controller determines an auxiliary balanced incomplete block design of this migration.

As described above, $\hat{B}[i]$ is an auxiliary BIBD used during the $i^{th}$ expansion, $\hat{b}_i$, $\hat{v}_i$, $\hat{k}_i$, $\hat{r}_i$, and $\hat{\lambda}_i$ are BIBD parameters of $\hat{B}[i]$, and $\hat{v}_i = v_i$ and $\hat{k}_i = v_{i-1}$ need to be satisfied. That is, in values of parameters of an auxiliary BIBD $\hat{B}[i]$ required for data migration during the $i^{th}$ expansion, a value of $\hat{v}_i$ is a value of a quantity $v_i$ of disks included in the storage system after the $i^{th}$ expansion, and a value of $\hat{k}_i$ is a value of a quantity $v_{i-1}$ of disks included in the storage system before the $i^{th}$ expansion. Further, after the values of the two parameters $\hat{v}_i$ and $\hat{k}_i$ are determined, the controller may query a BIBD database, and select one value from a plurality of values of $\lambda$ matching $\hat{v}_i$ and $\hat{k}_i$ as a value of $\hat{\lambda}_i$. It should be emphasized that a larger value of $\hat{\lambda}_i$ results in larger time consumption required for subsequent data query. It is usually suggested that the value of $\hat{\lambda}_i$ is a relatively small value. After determining the values of $\hat{v}_i$, $\hat{k}_i$, and $\hat{\lambda}_i$, the controller may query a tuple corresponding to $\hat{v}_i$, $\hat{k}_i$, and $\hat{\lambda}_i$ in the BIBD database, to obtain the auxiliary BIBD required for the $i^{th}$ migration. Further, the controller further needs to determine values of $\hat{b}_i$ and $\hat{r}_i$ in the auxiliary BIBD $\hat{B}[i]$. In this embodiment of the present invention, there may be two manners in which the values of $\hat{b}_i$ and $\hat{r}_i$ are obtained. Manner 1: The values of $\hat{b}_i$ and $\hat{r}_i$ may be determined based on the following formulas:

$$r = \frac{\lambda(v-1)}{k-1}, \text{ and}$$

$$b = \frac{vr}{k} = \frac{\lambda(v^2 - v)}{k^2 - k}.$$

Manner 2: The controller may alternatively obtain the values of $\hat{b}_i$ and $\hat{r}_i$ by directly collecting statistics on the foregoing tuple that is queried in the BIBD database and that is corresponding to $\hat{v}_i$, $\hat{k}_i$, and $\hat{\lambda}_i$.

For the storage system including four disks shown in FIG. 3, a BIBD of the storage system before the first expansion is shown in FIG. 2, and T[0] corresponding to the storage system is shown in FIG. 3. Assuming that three disks are added during the first expansion, that is, a quantity of disks included in the array after the expansion is $v_1 = 4+3 = 7$, parameters of $\hat{B}[1]$ are recorded as $\hat{b}_1$, $\hat{v}_1$, $\hat{k}_1$, $\hat{r}_1$, and $\hat{\lambda}_1$, and the parameters need to meet $\hat{v}_1 = v_1 = 7$ and $\hat{k}_1 = v_0 = 4$. FIG. 5 shows $\hat{B}[1]$ satisfying the condition, and parameters of $\hat{B}[1]$ are (7, 7, 4, 4, 2).

A chronological order of performing step 400 and step 401 is not limited. The two steps may be performed simultaneously, or step 401 may be performed after step 400 is performed, or vice versa.

Step 402. The controller migrates data.

The controller selects, based on the auxiliary balanced incomplete block design $\hat{B}[i]$, at least one migration unit from the plurality of migration units of the $v_{i-1}$ disks before the expansion, and migrates chunks included in the selected at least one migration unit to one of the $v_i$ disks after the expansion. A number of a disk in which each migration unit is located after the $i^{th}$ expansion depends on the auxiliary balanced incomplete block design $\hat{B}[i]$. For any migration unit Rm,n, whether Rm,n needs to be migrated is determined based on a tuple m of $\hat{B}[i]$. In this embodiment of the present invention, whether a migration unit Rm,n needs to be migrated may be determined with reference to the following criterion: If Rm,n is on a disk indicated by the auxiliary BIBD, the migration unit Rm,n does not need to be migrated; otherwise, is migrated to an added disk indicated by the auxiliary BIBD. Specifically, when a value of n is in the tuple m of $\hat{B}[i]$, it indicates that Rm,n is on the disk indicated by the auxiliary BIBD, and the migration unit Rm,n does not need to be migrated; otherwise, the migration unit Rm,n is migrated to the added disk based on an indication of the tuple m of $\hat{B}[i]$. In this embodiment of the present invention, that the migration unit Rm,n is migrated to the added disk based on the indication of the tuple m of $\hat{B}[i]$ may be specifically performed with reference to the following method:

Assuming that a number of a disk to which the migration unit Rm,n should be migrated is represented as X, X may be calculated as follows:

obtaining a set S0, where the set S0 is a difference set between the tuple m of $\hat{B}[i]$ and a set $\{0, 1, \ldots, v_{i-1}-1\}$;

obtaining a set S1, where the set S1 is a difference set between the set $\{0, 1, \ldots, v_{i-1}-1\}$ and the tuple m of $\hat{B}[i]$; and if a value of n is a $k^{th}$ smallest element in the set S1, a value of the number X of the disk being the $k^{th}$ smallest element in the set S0.

Figure 7:
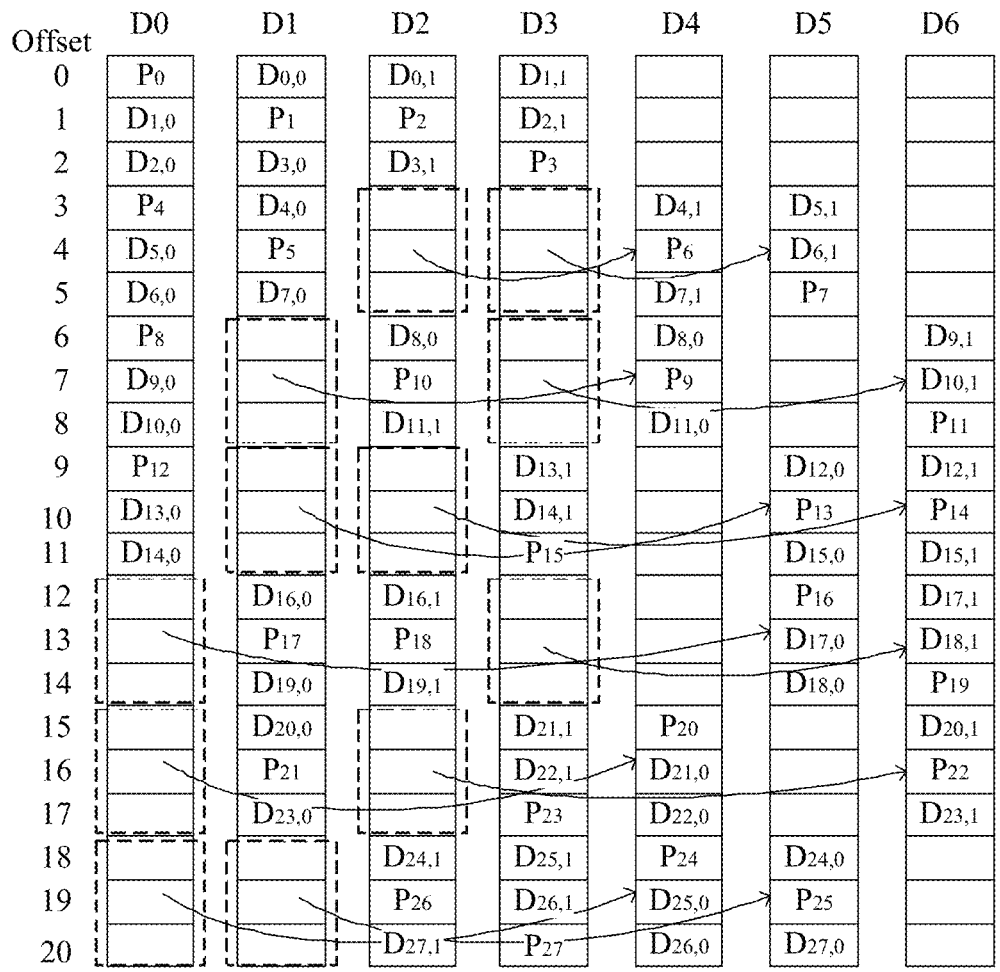
FIG. 7 is a schematic diagram of a data layout after data migration is completed after expansion according to an embodiment of the present invention.

For example, FIG. 6 is a schematic logic diagram of data migration, where each dot represents a migration unit. It may be learned from the figure that after expansion, dots located on disks D4 to D6 are migrated units. After the expansion, a data layout is shown in FIG. 7. A migration process of a data chunk $D_{4,1}$ is described as follows: Before the expansion, $D_{4,1}$ is on a disk D2, and an offset of $D_{4,1}$ is 3. For example, each migration unit calculated in step 400 includes three chunks, and a number L of a migration unit to which $D_{4,1}$ belongs is 3/3=1. The migration unit to which $D_{4,1}$ belongs is marked as $R_{1,2}$, that is, the value of m is 1, and the value of n is 2. Therefore, migration is performed by using a tuple 1, namely, $\{0, 1, 4, 5\}$, of an auxiliary BIBD. Because the value 2 of n is not in the tuple 1, it indicates that the migration unit $R_{1,2}$ needs to be migrated. A person skilled in the art may understand that before the migration, a tuple corresponding to migration units corresponding to chunks stored within an identical offset range of four disks (D0 to D3) is $\{0, 1, 2, 3\}$, and it is determined that the number X of the disk to which the migration unit $R_{1,2}$ needs to be migrated is specifically: the set S1 is $\{0, 1, 2, 3\} - \{0, 1, 4, 5\} = \{2, 3\}$, and the set S0 is $\{0, 1, 4, 5\} - \{0, 1, 2, 3\} = \{4, 5\}$. Because the value 2 of n is the first smallest element in the set S1, that is, the value of k is 1, the number X of the disk to which the migration unit $R_{1,2}$ needs to be migrated should be the first smallest element, that is, 4, in the set S0. To be specific, the migration unit $R_{1,2}$ needs to be migrated from a disk D2 in which the migration unit $R_{1,2}$ is located before the expansion to a disk D4 after the expansion, and the offset of the migration unit $R_{1,2}$ is maintained unchanged during the migration. Similarly, for a migration unit $R_{1,3}$, based on the foregoing method, it may be determined that the migration unit $R_{1,3}$ needs to be migrated to a disk D5. A person skilled in the art may understand that the foregoing instance is described by using only the data chunk $D_{4,1}$ as an example, and during actual migration, the migration unit is migrated as a whole. For example, for the migration unit $R_{1,2}$, three chunks $D_{4,1}$, $P_6$, and $D_{7,1}$ are migrated to the disk D4 as a whole. After the first expansion, if a user needs to query data stored in the storage system before the expansion, the controller may complete data query with reference to T[0] and $\hat{B}[1]$. In this way, in this embodiment of the present invention, the storage system completes data migration after the first expansion. In this embodiment of the present invention, data migration is guided by using an auxiliary BIBD after expansion. Because a quantity of tuples including any element in the auxiliary BIBD is identical and each migration unit includes an identical quantity of parity chunks, data chunks and parity chunks after the expansion are evenly distributed, and a data migration amount during the expansion is minimized. As shown in FIG. 7, only less than 50% of data is migrated. In this way, time required for data migration after the expansion is significantly reduced, and a delay in a response to a user request that is caused because a data migration operation needs to be performed after the expansion is also reduced.

Figure 8:
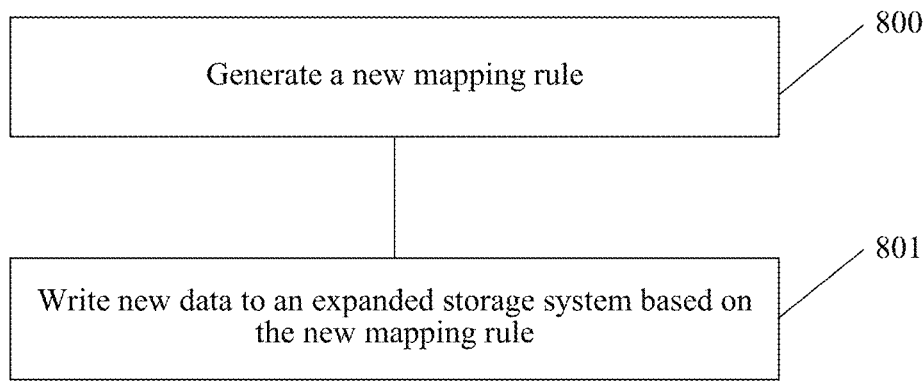
FIG. 8 is a flowchart of a method for writing new data to a storage system after expansion according to an embodiment of the present invention.

Further, because new data is still continuously written to the storage system after the expansion, and the new data should be subsequently stored in the storage system after the expansion, an embodiment of the present invention provides a flowchart of a method for writing the new data to the storage system after the expansion, as shown in FIG. 8.

Step 800. A controller generates a new full block design table T[i].

The controller determines remaining available storage space of each disk in the storage available space of the disk is usually space released after data is migrated, and may further include space not occupied before the expansion. For a new disk added during the expansion, remaining available space of the disk is usually storage space not occupied other than space occupied by data migrated to the disk. Logically, the controller considers remaining available space of each disk as a logically independent disk. A storage system including remaining space of disks is used as a logically new storage system. As shown in FIG. 7, the storage system after the first expansion has a total of seven disks, and each disk has available storage space with nine offsets. The controller generates the new full block design table T[i] for the storage system after the expansion, and T[i] is used to search for a storage location of new data written to the storage system after an $i^{th}$ expansion. For the five parameters ($b_i$, $v_i$, $k_i$, $r_i$, and $\lambda_i$) forming the BIBD of T[i], the controller may flexibly assign values to $v_i$, $k_i$, and $\lambda_i$ based on a requirement of a storage policy; obtain, by using the foregoing method, the BIBD used for forming T[i] and values of corresponding $b_i$ and $r_i$; and then obtain T[i] based on the newly obtained BIBD.

Step 801. The controller writes new data to the storage system based on T[i].

FIG. 9 is a schematic diagram according to an embodiment of the present invention. The schematic diagram shows an example in which T[1] is determined for the storage system after the first expansion and the new data is written based on T[1].

T[1] is on the right side of FIG. 9, and indicates that the newly generated T[1] includes seven stripes. Each stripe includes three chunks, where one chunk is a parity chunk. Distribution of the parity chunk on each stripe is shown in the figure. After the expansion is ended, if the controller receives a write request from a host, where the write request carries new to-be-written data, and it is assumed that the controller determines that the new to-be-written data is a data chunk $D_{28,0}$ and a data chunk $D_{28,1}$, a parity chunk $P_{28}$ corresponding to the data chunk $D_{28,0}$ and the data chunk $D_{28,1}$ is further determined based on a parity algorithm. Based on T[1] on the right side of FIG. 9, the controller determines that the foregoing data should be written to a stripe 0, that is, needs to be written to disks D1, D2, and D4. A writing order is that the parity chunk $P_{28}$ and the data chunks $D_{28,0}$ and $D_{28,1}$ should be sequentially written to the disks D1, D2, and D4. A write operation is that each chunk is, by default, written to an available location of the disk whose offset is currently smallest. Therefore, the parity chunk is written to a location of the disk D1 whose offset is 6, the data chunk $D_{28,0}$ is written to a location of the disk D2 whose offset is 3, and the data chunk $D_{28,1}$ is written to a location of the disk D4 whose offset is 0. The controller sequentially writes the data chunk $D_{28,0}$, the data chunk $D_{28,1}$, and the parity chunk $P_{28}$ to the corresponding locations of the disks D1, D2, and D4 respectively.

Figure 10:
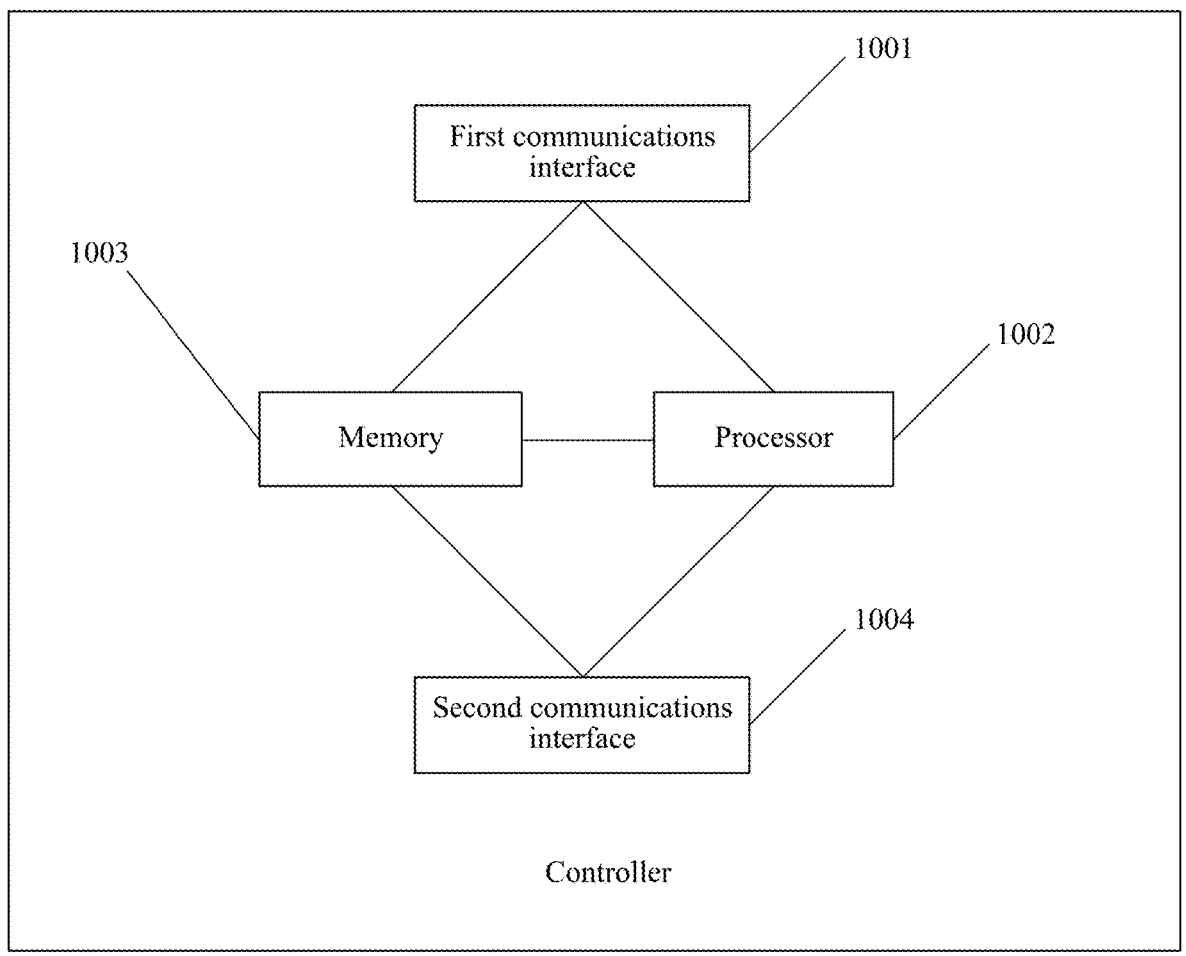
FIG. 10 is a schematic structural diagram of a controller according to an embodiment of the present invention.

FIG. 10 is a schematic structural diagram of a controller according to an embodiment of the present invention. The controller includes a first communications interface 1001, a processor 1002, a memory 1003, and a second communications interface 1004.

The first communications interface 1001 is configured to communicate with a host. The controller may receive an operating instruction from the host by using the first communications interface 1001, for example, a read request or a write request, and deliver the operating instruction to the processor 1002 for processing. The first communications interface 1001 is further configured to send a message to the host, for example, a write success message, a write failure message, a read failure message, or read data. The first communications interface 1001 may be a host bus adapter (Host Bus Adapter, HBA) card.

The processor 1002 may be a central processing unit (CPU), or an application-specific integrated circuit (ASIC), or may be one or more integrated circuits configured to implement the embodiments of the present invention.

The controller may further include the memory 1003. The memory 1003 may be configured to buffer data that is carried in a write request received from the host by using the first communications interface 1001, or buffer data read from a disk. The memory 1003 may be a volatile memory, a non-volatile memory, or a combination thereof. For example, the volatile memory is a random access memory (RAM). For example, the non-volatile memory is various machine-readable media that can store program code or data, for example, a floppy disk, a disk, a solid state disk (SSD), and an optical disc. The memory 1003 may have a power protection function. The power protection function means that data stored in the memory 1003 is not lost when a system is powered off and the system is powered on again. The memory 1003 may further store a program instruction. The processor 1002 is configured to execute the program instruction, to complete various processing actions of the controller. For details, refer to all processing actions of the controller in FIG. 2 to FIG. 9 and in corresponding embodiments. Details are not described again in this apparatus embodiment. Optionally, further, all of T[0], T[1], . . . , and T[t] and $\hat{B}[1]$, $\hat{B}[2]$, . . . , and $\hat{B}[t]$ generated by the processor 1002 may be stored in the memory 1003.

The second communications interface 1004 is configured to communicate with the disk. The processor 1002 of the controller may send an operating command such as a write request or a read request to the disk by using the second communications interface 1004, and receive various messages from the disk.

A person of ordinary skill in the art may understand that, each aspect of embodiments of present invention or a possible implementation of each aspect may be specifically implemented as a system, a method, or a computer program product. Therefore, each aspect of present invention or a possible implementation of each aspect may use forms of hardware only embodiments, software only embodiments (including firmware, resident software, and the like), or embodiments with a combination of software and hardware, which are collectively referred to as "circuit", "module", or "system" herein. In addition, each aspect of embodiments of present invention or a possible implementation of each aspect may take a form of a computer program product, where the computer program product refers to computer-readable program code stored in a computer-readable medium.

The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM), and an optical disc.

A processor in a computer reads the computer-readable program code stored in the computer-readable medium, so that the processor can execute each step in the flowchart or function actions specified in a combination of steps.

All computer-readable program code may be executed on a computer of a user, or some may be executed on a computer of a user as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two steps or chunks that depend on an involved function and are shown in sequence may be actually executed concurrently, or sometimes these chunks may be executed in a reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data migration method for a storage system after expansion, wherein the storage system comprises a controller, and one of the following:
   (a) $v_{i-1}$ disks before an $i^{th}$ expansion, and
   (b) $v_i$ disks after the $i^{th}$ expansion,
   wherein i is greater than or equal to 1, the controller communicates with all disks, data is distributed on the disks in the storage system based on a parity declustering technology, and
the method comprises:
   determining, by the controller, a quantity of chunks comprised in a migration unit for the $i^{th}$ expansion;
   dividing storage space of each of the $v_{i-1}$ disks comprised in the storage system before the $i^{th}$ expansion into a plurality of migration units, wherein each migration unit comprises a foregoing quantity of chunks;
   determining, based on a quantity $v_i$ of disks comprised in the storage system after the ith expansion and a quantity $v_{i-1}$ of disks comprised in the storage system before the ith expansion, an auxiliary balanced incomplete block design (BIBD) $\hat{B}[i]$ required for data migration after the ith expansion,
   the determining the auxiliary balanced incomplete block design (BIBD) B[i] required for data migration after the ith expansion comprises:
      determining that a value of a parameter $\hat{v}_i$ of $\hat{B}[i]$ is a value of $v_i$, and a value of $\hat{k}_i$ is a value of $v_{i-1}$;
      querying a BIBD database based on $\hat{v}_i$ and $\hat{k}_i$, to determine a value of $\hat{\lambda}_i$;
      querying the BIBD database based on the values of $\hat{v}_i$, $\hat{k}_i$, and $\hat{\lambda}_i$, to determine a tuple forming $\hat{B}[i]$; and
      determining values of parameters $\hat{b}_i$ and $\hat{r}_i$ of $\hat{B}[i]$; and
   selecting, based on the auxiliary BIBD $\hat{B}[i]$, at least one migration unit from the plurality of migration units of the $v_{i-1}$ disks before the ith expansion, and migrating chunks comprised in the selected at least one migration unit to one of the $v_i$ disks after the ith expansion.

2. The method according to claim 1, wherein that the data is distributed on the disks in the storage system based on the parity declustering technology comprises:
   determining, by the controller based on a full block design table, a storage location of the data in the storage system, wherein the full block design table is generated based on the auxiliary BIBD, and parameters of the auxiliary BIBD are (b, v, k, r, λ), wherein
   v indicates that the storage system comprises v disks;
   b indicates that the storage system comprises b stripes, respectively corresponding to b tuples of the balanced incomplete block design, wherein each element in each of the b tuples represents a disk number of a disk in which a chunk is stored in the storage system;
   k indicates that each stripe comprises k chunks;
   r indicates that each disk comprises r chunks;
   any two of the v disks each comprise λ same stripes; and
   the chunk is a data chunk or a parity chunk.

3. The method according to claim 2, further comprising:
   generating a full block design table T[i] for the storage system after each expansion, wherein T[i] is used for storing new data after the $i^{th}$ expansion, and $b_i$, $v_i$, $k_i$, $r_i$, and $\lambda_i$ are BIBD parameters forming T[i].

4. The method according to claim 1, wherein the determining the quantity of chunks comprised in the migration unit comprises:
   determining a quantity of chunks comprised in the migration unit by using the following:

$$len_i = \begin{cases} r_0, & i=1 \\ len_{i-1} \times \hat{b}_{i-1} \times \dfrac{r_{i-1}}{gcd(len_{i-1}(\hat{b}_{i-1} - \hat{r}_{i-1}), r_{i-1})}, & i>1 \end{cases},$$

wherein $r_{i-1}$ is a parameter of a BIBD T[i−1]; and $\hat{b}_{i-1}$ and $\hat{r}_{i-1}$ are parameters of a BIBD B[i−1], and gcd is an operation of taking a greatest common divisor.

5. The method according to claim 1, wherein the selecting the at least one migration unit from the plurality of migration units of the $v_{i-1}$ disks before the $i^{th}$ expansion, and migrating the chunks comprised in the selected at least one migration unit to one of the $v_i$ disks after the $i^{th}$ expansion comprises:
   when the selected at least one migration unit is Rm,n, wherein m represents a migration unit number of the selected at least one migration unit, and n represents a disk number of a disk in which the selected at least one migration unit is located;

obtaining a set S0, wherein the set S0 is a difference set between a tuple m of $\hat{B}[i]$ and a set $\{0, 1, \ldots, v_{i-1}-1\}$;

obtaining a set S1, wherein the set S1 is a difference set between the set $\{0, 1, \ldots, $ and $v_{i-1}-1\}$ and the tuple m of $\hat{B}[i]$;

when a value of n is a $k^{th}$ smallest element in the set S1, determining that a target disk number to which the migration unit Rm,n is to be migrated is an element whose value is the $k^{th}$ smallest in the set S0; and migrating the migration unit Rm,n to a disk corresponding to the target disk number.

6. A storage system, comprising a controller, and one of the following:
(a) $v_{i-1}$ disks before an $i^{th}$ expansion, and
(b) $v_i$ disks after the $i^{th}$ expansion,
wherein i is greater than or equal to 1, and the controller communicates with all disks;
wherein the disks are configured to store data, and the data is distributed on the disks based on a parity declustering technology; and
the controller is configured to:
determine a quantity of chunks comprised in a migration unit for the $i^{th}$ expansion;
divide storage space of each of the $v_{i-1}$ disks comprised in the storage system before the $i^{th}$ expansion into a plurality of migration units, wherein each migration unit comprises a foregoing quantity of chunks;
determine, based on a quantity $v_i$ of disks comprised in the storage system after the $i^{th}$ expansion and a quantity $v_{i-1}$ of disks comprised in the storage system before the $i^{th}$ expansion, an auxiliary balanced incomplete block design (BIBD) $\hat{B}[i]$ required for data migration after the $i^{th}$ expansion,
the determining the auxiliary balanced incomplete block design (BIBD) B[i] required for data migration after the ith expansion comprises:
determine that a value of a parameter $\hat{v}_i$ of $\hat{B}[i]$ is a value of $v_i$, and a value of $\hat{k}_i$ is a value of $v_{i-1}$;
query a BIBD database based on $\hat{v}_i$ and $\hat{k}_i$, to determine a value of $\hat{\lambda}_i$;
query the BIBD database based on the values of $\hat{v}_i$, $\hat{k}_i$, and $\hat{\lambda}_i$, to determine a tuple forming $\hat{B}[i]$;
determine values of parameters $\hat{b}_i$ and $\hat{r}_i$ of $\hat{B}[i]$; and
select, based on the auxiliary BIBD $\hat{B}[i]$, at least one migration unit from the plurality of migration units of the $v_{i-1}$ disks before the $i^{th}$ expansion, and migrate chunks comprised in the selected at least one migration unit to one of the $v_i$ disks after the $i^{th}$ expansion.

7. The storage system according to claim 6, wherein that the data is distributed on the disks based on the parity declustering technology comprises:
determining, by the controller, based on a full block design table, a storage location of the data in the storage system, wherein the full block design table is generated based on the auxiliary BIBD, and parameters of the auxiliary BIBD are (b, v, k, r, λ), wherein
v indicates that the storage system comprises v disks;
b indicates that the storage system comprises b stripes, respectively corresponding to b tuples of the balanced incomplete block design, wherein each element in each of the b tuples represents a disk number of a disk in which a chunk is stored in the storage system;
k indicates that each stripe comprises k chunks;
r indicates that each disk comprises r chunks;

any two of the v disks each comprise λ same stripes; and
the chunk is a data chunk or a parity chunk.

8. The storage system according to claim 7, wherein the controller is further configured to generate a full block design table T[i] for the storage system after each expansion, wherein T[i] is used for storing new data after the $i^{th}$ expansion, and $b_i$, $v_i$, $k_i$, $r_i$, and $\lambda_i$ are BIBD parameters forming T[i].

9. The storage system according to claim 6, wherein when determining the quantity of chunks comprised in the migration unit, the controller is further configured to:
determine the quantity of chunks comprised in the migration unit by using the following:

$$len_i = \begin{cases} r_0, & i = 1 \\ len_{i-1} \times \hat{b}_{i-1} \times \dfrac{r_{i-1}}{gcd(len_{i-1}(\hat{b}_{i-1} - \hat{r}_{i-1}), r_{i-1})}, & i > 1 \end{cases},$$

wherein $r_{i-1}$ is a parameter of a BIBD T[i−1]; and $\hat{b}_{i-1}$ and $\hat{r}_{i-1}$ are parameters of a BIBD B[i−1], and gcd is an operation of taking a greatest common divisor.

10. The storage system according to claim 6, wherein when selecting the at least one migration unit from the plurality of migration units of the $v_{i-1}$ disks before the $i^{th}$ expansion, and migrating the chunks comprised in the selected at least one migration unit to one of the $v_i$ disks after the $i^{th}$ expansion, and when the selected at least one migration unit is Rm,n, wherein m represents a migration unit number of the selected at least one migration unit, and n represents a disk number of a disk in which the selected at least one migration unit is located, the controller is configured to:
obtain a set S0, wherein the set S0 is a difference set between a tuple m of $\hat{B}[i]$ and a set $\{0, 1, \ldots, v_{i-1}-1\}$;
obtain a set S1, wherein the set S1 is a difference set between the set $\{0, 1, \ldots, v_{i-1}-1\}$ and the tuple m of $\hat{B}[i]$;
when a value of n is a $k^{th}$ smallest element in the set S1, determine that a target disk number to which the migration unit Rm,n is to be migrated is an element whose value is the $k^{th}$ smallest in the set S0; and
migrate the migration unit Rm,n to a disk corresponding to the target disk number.

11. A storage system comprising one of the following:
(a) $v_{i-1}$ disks before an $i^{th}$ expansion, and
(b) $v_i$ disks after the $i^{th}$ expansion,
wherein i is greater than or equal to 1, the controller communicates with all disks, data is distributed on the disks in the storage system based on a parity declustering technology, and
a non-transitory computer readable medium storing computer executable instructions for data migration for the storage system after expansion, wherein the storage system comprises a controller, wherein when the computer executable instructions are executed by the controller, the controller causes the computer executable instructions to perform:
determining a quantity of chunks comprised in a migration unit for the $i^{th}$ expansion;
dividing storage space of each of the $v_{i-1}$ disks comprised in the storage system before the $i^{th}$ expansion into a plurality of migration units, wherein each migration unit comprises a foregoing quantity of chunks;

determining, based on a quantity $v_i$ of disks comprised in the storage system after the ith expansion and a quantity $v_{i-1}$ of disks comprised in the storage system before the ith expansion, an auxiliary balanced incomplete block design (BIBD) $\hat{B}[i]$ required for data migration after the ith expansion, the determining the auxiliary balanced incomplete block design (BIBD) B[i] required for data migration after the ith expansion comprises:

determining that a value of a parameter $\hat{v}_i$ of $\hat{B}[i]$ is a value of $v_i$, and a value of $\hat{k}_i$ is a value of $v_{i-1}$;

querying a BIBD database based on $\hat{v}_i$ and $\hat{k}_i$, to determine a value of $\hat{\lambda}_i$;

querying the BIBD database based on the values of $\hat{v}_i$, $\hat{k}_i$, and $\hat{\lambda}_i$, to determine a tuple forming $\hat{B}[i]$; and determining values of parameters $\hat{b}_i$ and $\hat{r}_i$ of $\hat{B}[i]$; and selecting, based on the auxiliary BIBD $\hat{B}[i]$, at least one migration unit from the plurality of migration units of the $v_{i-1}$ disks before the ith expansion, and migrating chunks comprised in the selected at least one migration unit to one of the $v_i$ disks after the ith expansion.

12. The non-transitory computer readable medium of claim 11, wherein that the data is distributed on the disks in the storage system based on the parity declustering technology, the controller causes the computer executable instructions to further perform:

determining, based on a full block design table, a storage location of the data in the storage system, wherein the full block design table is generated based on the auxiliary BIBD, and parameters of the auxiliary BIBD are (b, v, k, r, λ), wherein v indicates that the storage system comprises v disks;

b indicates that the storage system comprises b stripes, respectively corresponding to b tuples of the balanced incomplete block design, wherein each element in each of the b tuples represents a disk number of a disk in which a chunk is stored in the storage system;

k indicates that each stripe comprises k chunks;

r indicates that each disk comprises r chunks;

any two of the v disks each comprise λ same stripes; and the chunk is a data chunk or a parity chunk.

13. The non-transitory computer readable medium of claim 12, wherein the controller causes the computer executable instructions to further perform:

generating a full block design table T[i] for the storage system after each expansion, wherein T[i] is used for storing new data after the $i^{th}$ expansion, and $b_i$, $v_i$, $k_i$, $r_i$, and $\lambda_i$ are BIBD parameters forming T[i].

14. The non-transitory computer readable medium of claim 11, wherein when determining the quantity of chunks comprised in the migration unit, the controller causes the computer executable instructions to further perform:

determining a quantity of chunks comprised in the migration unit by using the following:

$$len_i = \begin{cases} r_0, & i = 1 \\ len_{i-1} \times \hat{b}_{i-1} \times \dfrac{r_{i-1}}{gcd(len_{i-1}(\hat{b}_{i-1} - \hat{r}_{i-1}), r_{i-1})}, & i > 1, \end{cases}$$

wherein $r_{i-1}$ is a parameter of a BIBD T[i−1]; and $\hat{b}_{i-1}$ and $\hat{r}_{i-1}$ are parameters of a BIBD B[i−1], and gcd is an operation of taking a greatest common divisor.

15. The non-transitory computer readable medium of claim 11, wherein when selecting the at least one migration unit from the plurality of migration units of the $v_{i-1}$ disks before the $i^{th}$ expansion, and migrating the chunks comprised in the selected at least one migration unit to one of the $v_i$ disks after the $i^{th}$ expansion, and when the selected at least one migration unit is Rm,n, wherein m represents a migration unit number of the selected at least one migration unit, and n represents a disk number of a disk in which the selected at least one migration unit is located, the controller causes the computer executable instructions to further perform:

obtaining a set S0, wherein the set S0 is a difference set between a tuple m of $\hat{B}[i]$ and a set $\{0,1,\ldots,v_{i-1}-1\}$;

obtaining a set S1, wherein the set S1 is a difference set between the set $\{0,1,\ldots,$ and $v_{i-1}-1\}$ and the tuple m of $\hat{B}[i]$;

when a value of n is a $k^{th}$ smallest element in the set S1, determining that a target disk number to which the migration unit Rm,n is to be migrated is an element whose value is the $k^{th}$ smallest in the set S0; and migrating the migration unit Rm,n to a disk corresponding to the target disk number.

\* \* \* \* \*

UNITED STATES PATENT AND TRADEMARK OFFICE
CERTIFICATE OF CORRECTION

PATENT NO. : 10,908,833 B2
APPLICATION NO. : 16/291852
DATED : February 2, 2021
INVENTOR(S) : Xu et al.

It is certified that error appears in the above-identified patent and that said Letters Patent is hereby corrected as shown below:

In the Claims

Claim 1, Column 14, Line 8: "design (BIBD) B[i] required" should be -- design (BIBD) $\hat{B}$[i] required --.

Signed and Sealed this
Twelfth Day of July, 2022

Katherine Kelly Vidal
*Director of the United States Patent and Trademark Office*